Oct. 22, 1957 C. CALMON 2,810,692
ION EXCHANGE APPARATUS AND METHOD OF OPERATING SAME
Filed Aug. 18, 1953 2 Sheets-Sheet 1

LEGEND:-
——— MONOVALENT IONS (SODIUM)
————— BIVALENT IONS
············· TRIVALENT IONS
—·—·—· TETRAVALENT IONS

CALVIN CALMON
INVENTOR.

BY *Erin Pick*
ATTORNEY

Oct. 22, 1957 C. CALMON 2,810,692
ION EXCHANGE APPARATUS AND METHOD OF OPERATING SAME
Filed Aug. 18, 1953 2 Sheets-Sheet 2

CALVIN CALMON
INVENTOR.
BY
ATTORNEY

United States Patent Office 2,810,692
Patented Oct. 22, 1957

2,810,692
ION EXCHANGE APPARATUS AND METHOD OF OPERATING SAME

Calvin Calmon, Birmingham, N. J., assignor to The Permutit Company, New York, N. Y., a corporation of Delaware Application August 18, 1953, Serial No. 374,929

7 Claims. (Cl. 210—25)

This invention relates to ion exchange apparatus and a method of operating the same, and it comprises the use of a low cross-linked ion exchange resin for determining the end point of a run, as more fully described hereinafter and as claimed.

In the treatment of aqueous solutions of electrolytes by passage through a bed of ion exchange material, the treatment must be terminated and the material regenerated when the end point of the run has been reached, i. e. when the quality of the treated solution changes due to the appearance or breakthrough of a specific cation or anion, due to a change in concentration of electrolytes, or due to some other change. When softening water by cation exchange in the sodium cycle, for instance, the breakthrough or appearance of calcium or magnesium in the effluent is an indication that the end point of the run has been reached and that the cation exchange material needs to be regenerated. In softening water the end point is usually determined by the well-known soap test; in the simplest form of this test a certain amount of the effluent from the cation exchange apparatus is measured out in a bottle, a predetermined amount of a standard soap solution is added, and the mixture is shaken: the presence or absence of lather formed on shaking indicates that the concentration of calcium and magnesium in the tested sample is below or above a predetermined value, respectively. Other chemical or physical tests can be used to determine the end point in softening water or carrying out other ion exchange treatment. All such tests, however, take more or less time and involve manipulations by an operator or relatively complicated and costly apparatus.

The objects of this invention are to provide a rapid and simple method for determining the end point of ion exchange reactions, and also to provide relatively simple and inexpensive equipment for carrying out such method.

The manner in which the foregoing objects are achieved is shown in the accompanying drawings in which.

Ion exchange resins of the type used in the treatment of aqueous solutions of electrolytes are insoluble solid materials in which are incorporated certain acidic or basic active groups. In the case of cation exchange resins, the active groups are acidic components such as $SO_3H$, $COOH$, $PO(OH)_2$, etc., which are embodied in the matrix of the solid body consisting of a resinous material such as copolymers of styrene and divinylbenzene, acrylic type compounds and divinylbenzene, or condensation products of phenolic compounds and formaldehyde. When such an ion exchange resin is dried and then placed in water it swells. The degree of swelling depends on the active group, the ion in the exchange position, and the degree of cross-linking in the polymer. If such cation exchange resin is placed in distilled water and the distilled water is then replaced by a strong electrolyte, the external volume of the ion exchange resin shrinks, the degree of shrinking or de-swelling depending on the concentration of the electrolyte in contact with the resin and upon the valence of the cation in the exchange position. That is to say, if the cation in the exchange position is changed from a lower valence to a higher valence, the external volume of the ion exchange resin will shrink. The following table shows the wet volume ratio for various ions on a sulfonated cross-linked polystyrene resin with various percentages of divinylbenzene used for cross-linking:

| Percent Divinylbenzene Content | $H^+$ | $Na^+$ | $Mg^{++}$ | $Cr^{+++}$ | $Th^{++++}$ |
|---|---|---|---|---|---|
| 0.25 | 1.0 | 1.0 | 0.43 | 0.15 | 0.07 |
| 0.50 | 1.0 | 1.0 | 0.44 | 0.17 | 0.10 |
| 1.0 | 1.0 | 1.0 | 0.47 | 0.23 | 0.13 |
| 2.0 | 1.0 | 1.0 | 0.70 | 0.53 | 0.38 |
| 3.5 | 1.0 | 0.99 | 0.84 | 0.66 | 0.54 |
| 7.0 | 1.0 | 0.95 | 0.95 | 0.94 | 0.88 |
| 10.0 | 1.0 | 0.96 | 1.0 | 1.0 | 0.89 |
| 15.0 | 1.0 | 0.96 | 1.0 | 0.98 | 0.93 |

Figure 1:
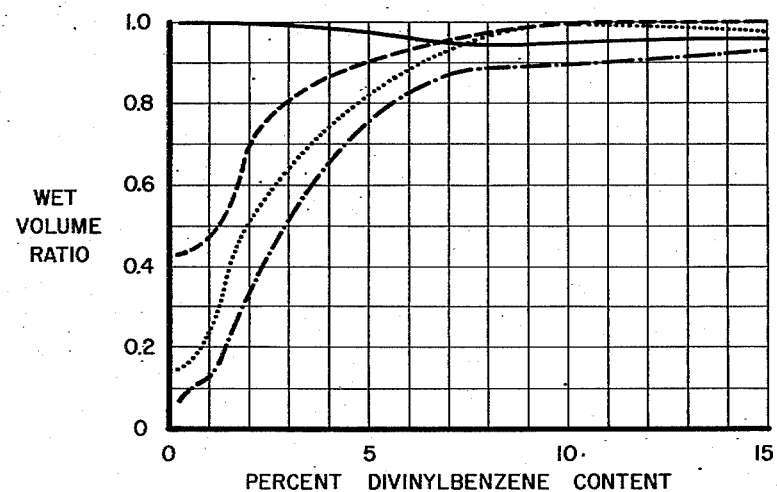
Fig. 1 is a graph showing the wet volume ratio of ion exchange resins of varying divinylbenzene content and used in the exchange of ions of different valencies.

In this table, 1.0 denotes the wet density of the resin in distilled water. The observations were carried out on 10 milliliter columns of material all passing through a 16 mesh screen and retained on a 40 mesh screen. The data tabulated in the foregoing table are graphically represented in the diagram shown in Fig. 1. As clearly shown by this diagram the volume shrinkage of the resin when replacing the ion in the exchange position by one of higher valence is appreciable when the divinylbenzene content is less than about 5%.

I have discovered that such volume change of a low cross-linked resin having a divinylbenzene content of 0.25 to 5 percent, preferably about 1 percent, can be used to determine the end point of a run on a cation exchange unit such as a water softener. The following table shows how the volume ratio of a low cross-linked polystyrene resin having a divinylbenzene content of 1 percent changed when such resin was first placed in distilled water which was then displaced by the effluent from a zeolite water softener:

| Liters of Effluent | Percent of Run | Softness of Water | Volume Ratio of Low Cross-Linked Resin |
|---|---|---|---|
| Distilled water | 0 | | 1.0 |
| 1.0 | 3 | 2 | 0.94 |
| 2.0 | 6 | 2 | 0.90 |
| 9.0 | 28 | 2 | 0.90 |
| 16.0 | 50 | 2 | 0.89 |
| 23.0 | 72 | 2 | 0.90 |
| 26.0 | 81 | 2 | 0.89 |
| 29.0 | 90 | 2 | 0.87 |
| 30.0 | 93 | 5 | 0.86 |
| 32.0 | 100 | 5 | 0.85 |
| 32.2 | 101 | >8 | 0.81 |
| 33.0 | 103 | >8 | 0.73 |
| 34.0 | 105 | >8 | 0.54 |

Figure 2:
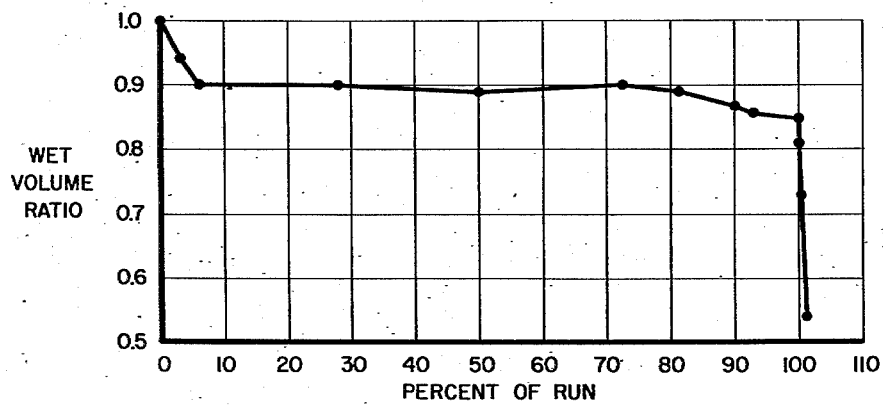
Fig. 2 is a graph showing the volume of ion exchange resin containing one percent divinylbenzene and contacted by the effluent of a cation exchange water softener during a run.

In this table the softness of the water is expressed as the number of drops of Boutron-Boudet soap solution required in a water sample of 40 milliliters to produce a lather. The percent of run value was determined on the assumption that the end point was reached when 8 drops of such soap solution were required to produce a lather in a sample of 40 milliliters. The results given in the foregoing table are illustrated graphically in Fig. 2. It will be observed that on displacing the distilled water by effluent from the zeolite softener containing sodium the volume quickly dropped about 10 percent. It then remained constant for the major part of the run. Toward the end of the run it gradually dropped approximately 5 percent more and when the end of the run was reached the volume dropped rapidly and abruptly to approximately half of its original value.

In conducting the test just described, a water was used which prior to treatment in the zeolite water softener had the following composition:

| Ion | Parts per million as CaCO₃ |
| --- | --- |
| Ca | 285 |
| Mg | 143 |
| Na | 6 |
| Cl⁻ | 305 |
| SO₄ | 14 |
| HCO₃ | 115 |

The ion exchange material used in the zeolite water softener was a styrene divinylbenzene resin having a divinylbenzene content of approximately 10 percent and which was regenerated with sodium chloride. The quantity of low cross-linked resin employed as indicator was 5 milliliters which was placed in the form of a bed in a glass tube so that its volume could readily be observed.

Figure 3:
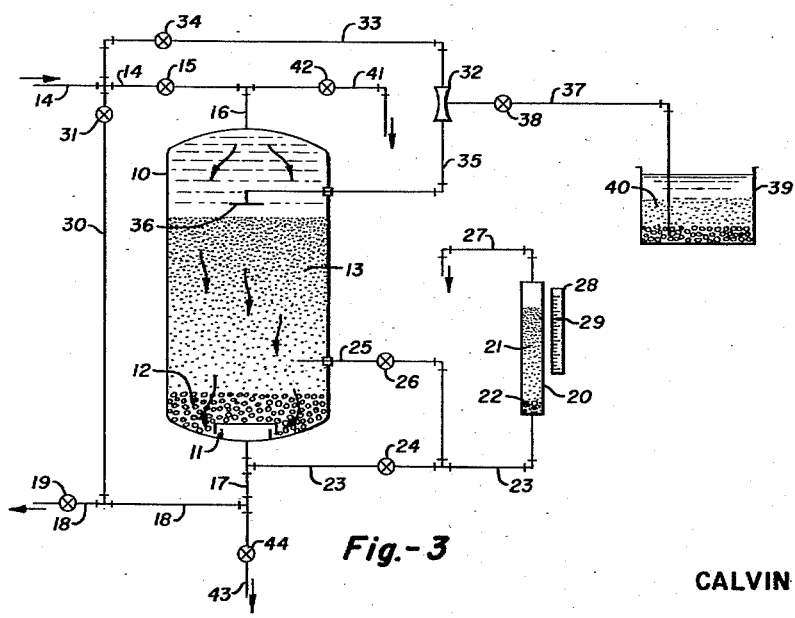
Fig. 3 is a diagrammatic showing of an apparatus according to my invention.

Fig. 3 shows an arrangement suitable for carrying out my invention. A tank 10 is provided with a bottom distributor 11 over which is placed a layer of gravel 12 supporting a bed of cation exchange material 13. Raw water to be softened is admitted to the top of tank 10 through a pipe 14 with valve 15, and pipe 16. Treated water leaves the tank 10 through a pipe 17 connected to a pipe 18 provided with a service valve 19. A container 20 made of glass or a suitable transparent plastic material has therein a bed 21 of low cross-linked ion exchange resin supported on glass wool 22 and is adapted to receive water treated by contact with the entire bed of ion exchange material 13 through the pipe 23 provided with a valve 24 and leading from pipe 17 to the lower end of container 20. Alternatively, water may be passed to the container 20 through a pipe 25 embedded in the cation exchange material 13, provided with a valve 26, and connected to pipe 23 between the valve 24 and the container 20. A pipe 27 leads from the top of the container 20 to a suitable point of disposal for the water sample passing through the container 20. Adjacent to the container 20 is a suitably-marked scale 28 which preferably has a special mark 29 to denote the volume of the bed of resin 21 in container 20 when the end point of the softening run in tank 10 has been reached. As long as the cation exchange material 13 is capable of softening water the volume of the bed 21 wlil be relatively large and the top of the bed will be above the mark 29 as illustrated in Fig. 3.

In operation of the apparatus shown in Fig. 3 water is admitted to the tank 10 through open valve 15 and pipes 14 and 16, becomes softened by downward flow through the bed 13 and leaves the tank 10 through pipes 17 and 18 and open valve 19 to a point of use. A sample of the treated water flowing through pipe 17 is passed through pipe 23 and open valve 24 to the container 20, wherein it contacts the bed 21. The water then flows to waste through pipe 27. Any volume change of the bed 21 can readily be noted by reference to the scale 28. When the volume of the bed 21 has dropped to a predetermined value such as that indicated by the mark 29, the softening operation is interrupted by closing valves 15 and 19 and the cation exchange material 13 is then regenerated in a well-known manner.

For carrying out the cycle of reconditioning operations, as a rule collectively referred to as "regeneration," additional piping, valves, etc. are provided as follows. A pipe 30 with valve 31 interconnects pipes 14 and 18.

An injector 32 has a supply pipe 33 with valve 34 connected to pipe 14, a discharge connection 35 leading to a regenerant distributor 36 within tank 10 above the bed 13, and a suction pipe 37 provided with a valve 38 and leading to a regenerant tank 39 containing a supply of regenerant 40, such as sodium chloride immersed in water to provide brine. A pipe 41 with valve 42 is connected to pipe 16, and a pipe 43 with valve 44 is connected to pipe 17. Pipes 41 and 43 lead to a point of disposal for waste liquid.

In order to regenerate the apparatus, valves 15 and 19 are closed first to terminate the softening operation as noted above. The first step in regeneration is usually the operation referred to as "backwashing." To carry out this step valves 31 and 42 are opened so as to establish a flow of water from pipe 14 through pipes 30, 18, and 17 to the distributor 11, upwardly through the bed 13 and to waste via pipe 41. The backwashing re-grades the bed 13 and washes it clean of impurities collected in its upper portion during downflow softening. During backwashing, part of the backwash water flows from pipe 17 to the container 20, upwardly through the bed 21 and to waste via pipe 27. Such backwashing of the bed 21 does no particular harm nor, however, does it do any good since the normal flow through the bed 21 is in the same direction. If desired, such washing of the bed 21 can be prevented by closing valve 24 when backwashing is initiated, and opening it again when backwashing is terminated by the closing of valves 31 and 42.

Next, regenerant is introduced by opening valves 34, 38, and 44. Water now flows to the injector 32 from pipe 14 through pipe 33 and causes brine to flow from tank 39 through pipe 37 to the injector 32. The diluted brine discharged by the injector 32 flows through pipe 35 to the distributor 36, then down through the bed 13 and via pipe 17 to waste. Finally, when an adequate quantity of regenerant has been injected the spent and excess regenerant is rinsed out. This can be accomplished by simply closing valve 38 so that the flow of brine to the injector 32 is stopped and raw water flows through the distributor 36, bed 13, distributor 11 and pipes 17 and 43 to waste. When rinsing has been completed valves 34 and 44 are closed and valves 15 and 19 are opened to restore the apparatus to normal service. Subsequently the regenerant tank may be refilled with water by opening valve 38.

During regenerant introduction and rinsing part of the flow through pipe 71 is branched off through pipe 23, bed 21 and pipe 27. Since it is customary to employ an excess of regenerant in regenerating a zeolite softener, the last of the regenerant solution passing through the bed 21 prior to rinsing is relatively pure sodium chloride solution which restores the bed 21 to the sodium condition with resultant volume expansion. The bed 21, by its relatively large volume, thus again serves as an indicator that the treated water flowing from the tank 10 is soft, without having required any special treatment steps or manipulations. This cycle of operations can be repeated over and over.

With the sample of water taken from pipe 17 via pipe 23 as described, it is inevitable that water having some hardness passes to service via pipe 18 before the volume shrinkage of the bed 21 indicates that the end point of the run has been reached. In many uses this is not objectionable. When it is important, however, that no hardness reaches the service pipe, the operator closes valve 24 and opens valve 26 instead. Then the indicator bed 21 will indicate by its volume reduction that the end point of the run has been reached before any hardness appears in the treated water flowing through pipe 17.

The volume of the bed 21 of low cross-linked ion exchange resin thus serves as a convenient guide in operating a softener with manual valves. It can, however, also be used for controlling an automatically-operated softener by employing modifications such as those shown in Figs. 4 and 5.

Figure 4:
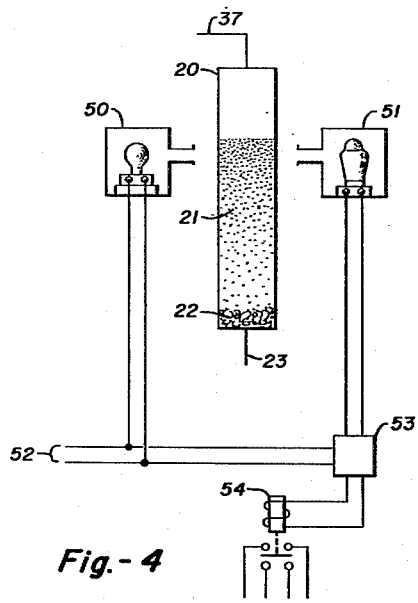
Figs. 4 and 5 are modifications of the apparatus shown in Fig. 3.

In Fig. 4 a source of light 50 is arranged on one side of the container 20 so as to throw a beam of light on a photo-electric cell 51 arranged on the opposite side. The positions of the light 50 and the cell 51 are such that the beam passes through the upper portion of the bed 21 when it is in its expanded condition. When the bed 21 contracts as the end point of the run is reached the resin drops below the path of light which now reaches cell 51 with greatly increased intensity. With electric energy supplied to wires 52, this increased light intensity reaching cell 51 is used, through conventional electronic devices 53, to actuate a solenoid switch 54. An automatic water softener suitable for control by my novel method is, for instance, shown in Pick U. S. Patent No. 2,122,824 granted July 5, 1938, the solenoid switch 54 of my Fig. 4 simply replacing the solenoid switch represented by numerals 254 to 260 in Fig. 12 of said Pick patent.

Figure 5:
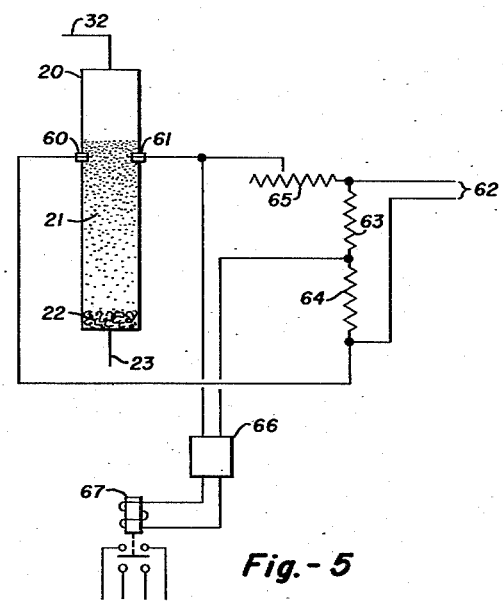

In Fig. 5 another system of automatic control is shown which depends on electric conductivity. Here the container 20 (which in this case need not be transparent but should be made of electrically noncondutive material) is provided with a pair of electrodes 60 and 61. Electric energy is supplied to wiring 62 which includes fixed resistances 63 and 64, an adjustable resistance 65, a meter 66 and a solenoid switch 67. The resistances 63, 64, and 65, together with the resistance between electrodes 60 and 61, form a Wheatstone bridge. When the resin 21 is in its expanded condition the resistance 65 is adjusted so that no current flows to the meter 66. When the resin 21 contracts upon reaching the end point of the run the top of the bed drops below the level of the electrodes 60 and 61. The resultant increase in resistance between electrodes 60 and 61 sends an electric impulse to the meter 66 which in turn actuates the solenoid switch 67 to start regeneration in a manner analogous to that described in connection with Fig. 4.

While I have shown and described what I consider the preferred embodiments, modifications may be made without departing from the spirit of my invention and reference is, therefore, made to the appended claims for a definition of the scope of my invention.

What I claim is:

1. A method of operating an ion exchange apparatus having a main bed of ion exchange material and an auxiliary bed of low cross-linked ion exchange resin which method includes the steps of (a) establishing a flow of aqueous solution of electrolytes through said main bed and passing a portion of said flow additionally through said auxiliary bed while passing the remainder of said flow to a point of use, (b) determining change in volume of said auxiliary bed, (c) terminating said flow when said change in volume has reached a predetermined value, and (d) subsequently regenerating said main bed and said auxiliary bed.

2. The method of claim 1 in which said ion exchange resin is a sulfonated polystyrene resin cross-linked with 0.25 to 5 percent divinylbenzene.

3. An ion exchange apparatus comprising a tank containing ion exchange material, means for establishing a flow of aqueous solution to be treated through said tank, means for regenerating said ion exchange material, a container, a bed of low cross-linked ion exchange resin in said container, connections for passing treated solution from said tank through said container and for regenerating said bed, and means for determining change in the volume of said bed.

4. The apparatus of claim 3, said container having walls of transparent material and said last named means including a mark located adjacent to the upper portion of said bed.

5. The apparatus of claim 3, said last named means including a light source arranged to throw a beam of light through said container in the vicinity of the top of said bed, and a photoelectric cell adapted to receive said beam of light.

6. The apparatus of claim 3, said last named means including a pair of electrodes mounted on said container in the vicinity of the top of said bed.

7. In the apparatus of claim 3, a switch adapted to be actuated by said last named means, said switch being arranged to control said regenerating means.

References Cited in the file of this patent

UNITED STATES PATENTS

| | | |
|---|---|---|
| 1,931,968 | Sweeney et al. | Oct. 24, 1933 |
| 2,340,110 | D'Alelio | Jan. 25, 1944 |
| 2,365,221 | Shafor | Dec. 19, 1944 |
| 2,366,007 | D'Alelio | Dec. 26, 1944 |
| 2,405,479 | Whittlock | Aug. 6, 1946 |
| 2,573,685 | Blinn et al. | Nov. 6, 1951 |
| 2,628,191 | Sard | Feb. 10, 1953 |
| 2,741,912 | Schultze | Apr. 17, 1956 |

OTHER REFERENCES

Nachod: "Ion Exchange," New York: Acadamic Press, 1949, pp. 10, 22 and 47.